US009003832B2

(12) United States Patent
Kemmochi et al.

(10) Patent No.: US 9,003,832 B2
(45) Date of Patent: Apr. 14, 2015

(54) METHOD OF MAKING A SILICA CRUCIBLE IN A CONTROLLED ATMOSPHERE

(75) Inventors: Katsuhiko Kemmochi, Camas, WA (US); Thomas Kayser, Leipzig (DE); Robert Joseph Coolich, North Bonneville, WA (US); Walter Lehmann, Leipzig (DE)

(73) Assignees: Heraeus Shin-Etsu America, Inc., Camas, WA (US); Heraeus Quarzglas GmbH & Co. KG (DE)

( * ) Notice: Subject to any disclaimer, the term of this patent is extended or adjusted under 35 U.S.C. 154(b) by 31 days.

(21) Appl. No.: 12/623,140

(22) Filed: Nov. 20, 2009

(65) Prior Publication Data

US 2011/0123738 A1    May 26, 2011

(51) Int. Cl.
C03B 19/09    (2006.01)

(52) U.S. Cl.
CPC .................. *C03B 19/095* (2013.01)

(58) Field of Classification Search
USPC .......................................... 65/17.3
See application file for complete search history.

(56) References Cited

U.S. PATENT DOCUMENTS

| 4,416,680 | A | 11/1983 | Brüning et al. |
| 4,935,046 | A | 6/1990 | Uchikawa et al. |
| 4,956,208 | A | 9/1990 | Uchikawa et al. |
| 5,762,672 | A | 6/1998 | Ikeda et al. |
| 5,913,975 | A | 6/1999 | Holder |
| 5,989,021 | A | 11/1999 | Sato et al. |
| 6,136,092 | A | 10/2000 | Sato et al. |
| 6,143,073 | A | 11/2000 | Christman et al. |
| 6,502,422 | B1 | 1/2003 | Hansen et al. |
| 6,510,707 | B2 | 1/2003 | Kemmochi et al. |
| 6,546,754 | B1 | 4/2003 | Hansen et al. |
| 6,553,787 | B1 | 4/2003 | Akiho et al. |
| 6,641,663 | B2 | 11/2003 | Kemmochi et al. |
| 6,652,934 | B1 * | 11/2003 | Miyao et al. ................. 428/34.4 |
| 6,886,364 | B2 | 5/2005 | Ohama et al. |
| 7,118,789 | B2 | 10/2006 | Kemmochi et al. |
| 7,383,696 | B2 | 6/2008 | Kemmochi et al. |
| 7,993,556 | B2 | 8/2011 | Kemmochi et al. |
| 2002/0166340 | A1 * | 11/2002 | Kemmochi et al. ............ 65/17.3 |

(Continued)

FOREIGN PATENT DOCUMENTS

DE    1 965 558    9/1970
DE    01-157428 A    6/1989

(Continued)

OTHER PUBLICATIONS

JP 09-020586 machine translation, Sakikubo Kunihiko, Production of Quartz Glass Crucible for Pulling Silicon Single Crystal, Jan. 21, 1997.*

*Primary Examiner* — Queenie Dehghan
(74) *Attorney, Agent, or Firm* — Marger Johnson & McCollom, P.C.

(57) ABSTRACT

A silica crucible is made in a mold cavity of the type in which ambient atmosphere can be drawn through silica grain in the cavity. In one embodiment, a silica grain layer is formed in the mold cavity and gas, which may comprise helium, nitrogen, hydrogen, or a mixture thereof, is introduced into the mold cavity. The silica grain layer is heated while substantially no ambient atmosphere is drawn through the silica grain. Thereafter, at least a portion of the silica grain layer is fused while drawing ambient atmosphere through the silica grain. The gas displaces air in the mold cavity thereby reducing nitrogen oxides and ozone.

35 Claims, 3 Drawing Sheets

(56) References Cited

U.S. PATENT DOCUMENTS

| | | |
|---|---|---|
| 2002/0166341 A1 | 11/2002 | Shelley et al. |
| 2003/0029195 A1 | 2/2003 | Watanabe |
| 2003/0074920 A1 | 4/2003 | Ohama et al. |
| 2007/0051296 A1 | 3/2007 | Kemmochi et al. |
| 2007/0051297 A1 | 3/2007 | Kemmochi et al. |
| 2007/0102133 A1 | 5/2007 | Kemmochi et al. |
| 2009/0041960 A1 | 2/2009 | Kemmochi et al. |
| 2009/0277223 A1 | 11/2009 | Kayser et al. |
| 2009/0320521 A1* | 12/2009 | Lehmann et al. ............... 65/17.6 |
| 2010/0154701 A1 | 6/2010 | Kemmochi et al. |
| 2011/0123738 A1 | 5/2011 | Kemmochi et al. |
| 2011/0192758 A1 | 8/2011 | Yamagata et al. |

FOREIGN PATENT DOCUMENTS

| | | |
|---|---|---|
| EP | 0 693 461 A1 | 1/1996 |
| EP | 1 094 039 A1 | 4/2001 |
| JP | 63166791 | 7/1988 |
| JP | 01-157427 A | 6/1989 |
| JP | 7196397 | 8/1995 |
| JP | 08-268727 A | 10/1996 |
| JP | 09-020586 A | 1/1997 |
| JP | 11-199369 A | 7/1999 |
| JP | 2000-264776 A | 9/2000 |
| JP | 2000-344536 A | 12/2000 |
| JP | 2001-002430 A | 1/2001 |
| JP | 2001-233629 A | 8/2001 |
| JP | 2001-302391 A | 10/2001 |
| JP | 2001-328831 | 11/2001 |
| JP | 2001-328831 A | 11/2001 |
| JP | 2003034593 | 2/2003 |
| JP | 2003-313035 A | 11/2003 |
| JP | 2004-517793 | 6/2004 |
| JP | 2004-518601 A | 6/2004 |
| JP | 2004-292211 A | 10/2004 |
| JP | 2004-292214 A | 10/2004 |
| JP | 2005206446 B2 | 8/2005 |
| JP | 2005-343707 A | 12/2005 |
| JP | 2006-124235 A | 5/2006 |
| JP | 2007070221 | 3/2007 |
| JP | 2008081398 | 3/2008 |
| JP | 2009-084113 A | 4/2009 |
| WO | WO 2007/063996 A1 | 6/2007 |
| WO | 2009041684 | 9/2008 |

* cited by examiner

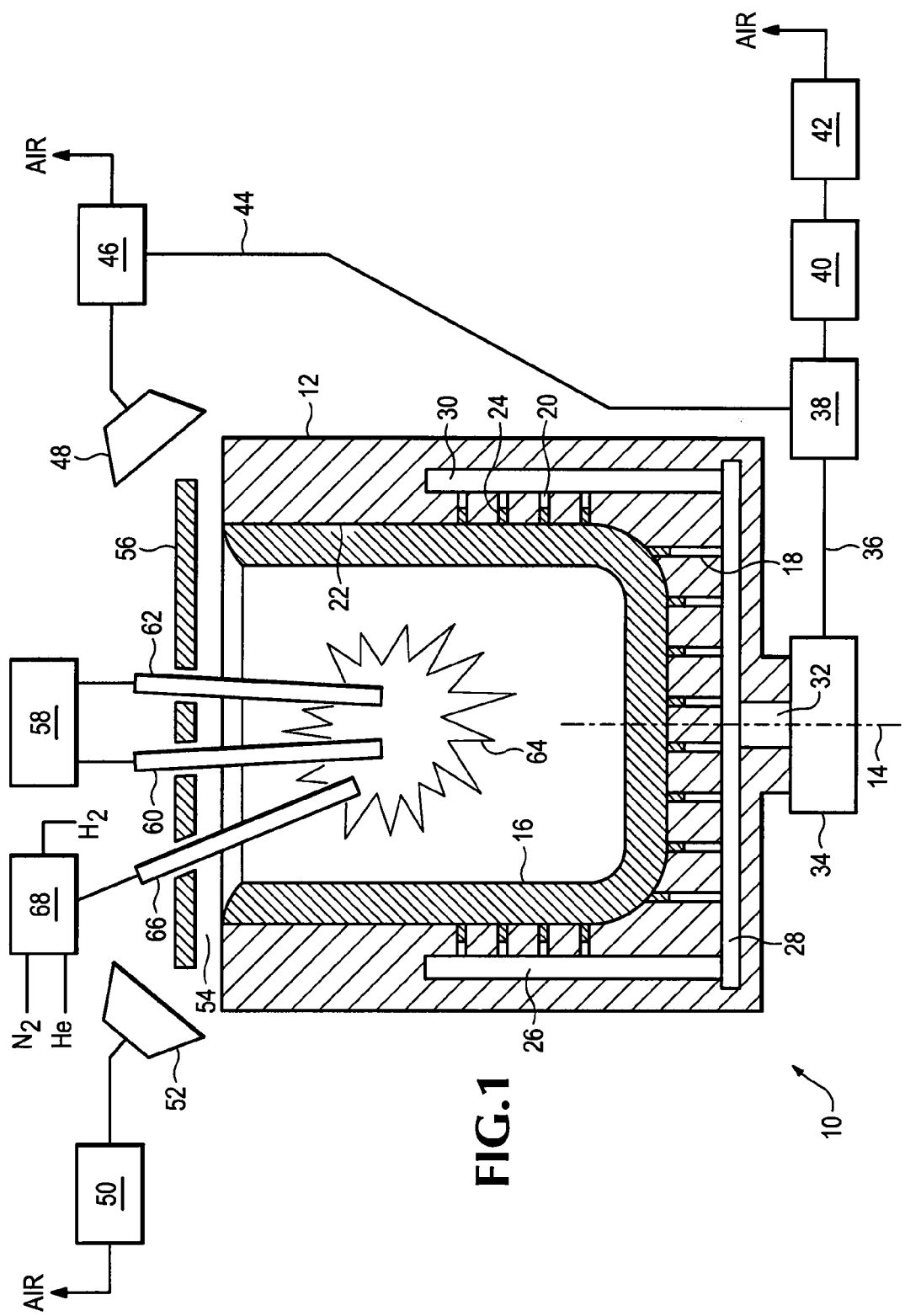

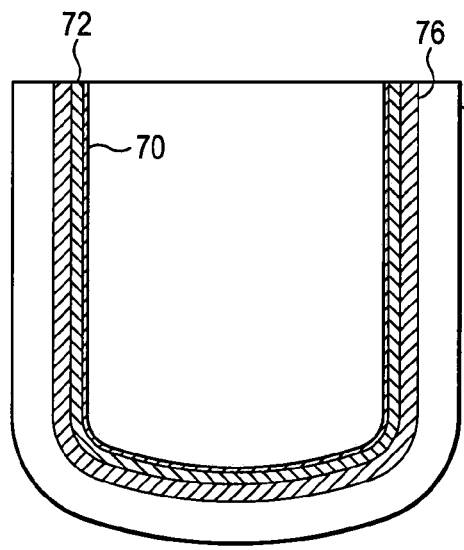
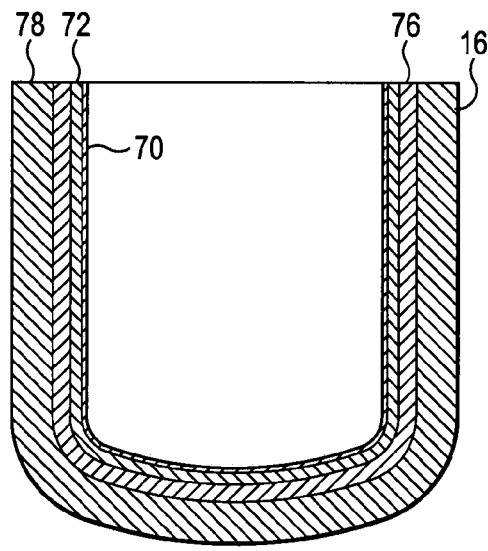
FIG.2D  FIG.2E
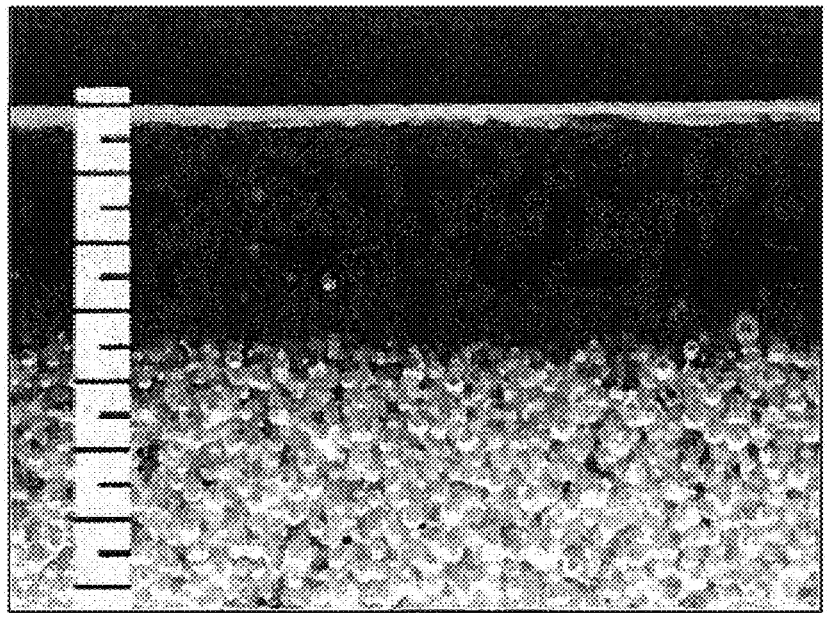
FIG.3

METHOD OF MAKING A SILICA CRUCIBLE IN A CONTROLLED ATMOSPHERE

FIELD OF THE INVENTION

The present invention relates to methods of making a silica crucible and more particularly to such methods in which a gas, such as helium or hydrogen, is supplied during heating and fusion of silica grain that forms the crucible.

DESCRIPTION OF THE RELATED ART

There are several methods of making single crystal silicon materials. One such process—the Czochralski ("CZ") process—has been widely adopted for producing single crystal silicon materials for semiconductor applications including solar cells. In the CZ process, molten silicon is contained within a vessel and the tip of a single-crystalline seed crystal is dipped into the molten silicon. The seed crystal is then pulled upwardly while being rotated. As a result, a single crystal silicon ingot grows from the molten silicon.

A crucible in the shape of a bowl is typically used to hold the molten silicon in the CZ process. The arc-fusion method is a common way to make such a crucible. In this process, silica grain is formed in a bowl-shaped cavity of a rotating mold and is shaped into the form of the crucible. Thereafter a set of electrodes lowers into the cavity, and high voltage is applied to create a ball of arc-plasma that fuses the grain. After fusion, the crucible is removed from the mold, mechanically machined into its final form, cleaned, and packaged for shipping.

The heat required to so make a crucible sublimates some of the silica into fume. In addition, the electric arc generates ozone and nitrogen oxides ($NO_x$). One or more exhaust fans are used in combination with hoods to vent these gases during the fusion process. Both ozone and $NO_x$ are hazardous to the environment. As a result, treatment and discharge of these gases are increasingly subject to government regulation.

During the fusion process, air and generated gases may be trapped in the silica grain during fusion. This results in a crucible having bubbles of varying sizes formed therein. During the CZ process, the inner layer of the crucible typically dissolves into the molten silicon. Any bubbles present in the inner layer during dissolution may eject particles into the melt as the bubbles open. These particles may disturb the single-crystalline structure of the silicon ingot being formed. As a result, it is desirable to manufacture crucibles with as few bubbles as possible in the inner layer. The outermost crucible layer, on the other hand, is formed to include many bubbles, which facilitate scattering of radiation from heating elements used in the CZ process.

One known method for minimizing bubbles in the inner layer is to use a gas permeable mold and apply a strong vacuum to the exterior of the mold during fusion. The goal is to withdraw as much gas as possible so that the silica grains fuse together in the absence of any entrapped gas. Initially, gasses within the crucible flow radially outwardly through the silica grain and into the vacuum system. When the innermost layer of the crucible fuses to the point it is gas impermeable, the flow of gas is from the upper edge of the crucible, downwardly through the silica grain and into the vacuum system. After the innermost layer fuses, a very strong vacuum is applied, which withdraws the gases from the silica grain and therefore minimizes bubbles. But until the fused, gas-impermeable innermost layer is formed, the vacuum is not very strong. As a result, the innermost layer has a higher bubble content than the layer formed immediately below the innermost layer. Having bubbles in the innermost layer is disadvantageous as described above.

Different approaches have been used to respond to this problem. Some have removed the innermost layer using either mechanical or chemical processes after fusion is complete. Another prior art approach is to provide helium or other gasses into the mold cavity during fusion. This results in helium bubbles in the crucible, but the helium bubbles rapidly diffuse in the glass and may be collapsed before completion of fusion.

Although ideally, only helium bubbles—which collapse—would remain, in practice, other bubbles are present. As a result, the innermost layer—the layer formed before the inner surface of the crucible becomes gas impermeable—still retains some bubbles formed from air and other gasses, enough to cause problems in the CZ process.

In addition to these crucible problems, the exhaust fans mix the $NO_x$ and ozone with ambient air, which makes it more difficult to economically and effectively treat the gases collected by the exhaust fans to prevent environmental damage that can be caused by $NO_x$ and ozone.

BRIEF DESCRIPTION OF THE DRAWINGS

FIG. 1 is a highly schematic depiction of a system for implementing an embodiment of the present method.

FIGS. 2A-2E depict sequential stages in the formation of a crucible using an embodiment of the present method.

FIG. 3 is a photograph of a sectioned crucible made according to an embodiment of the present invention after a vacuum bake test, which simulates the CZ process.

DETAILED DESCRIPTION

Figure 2A:
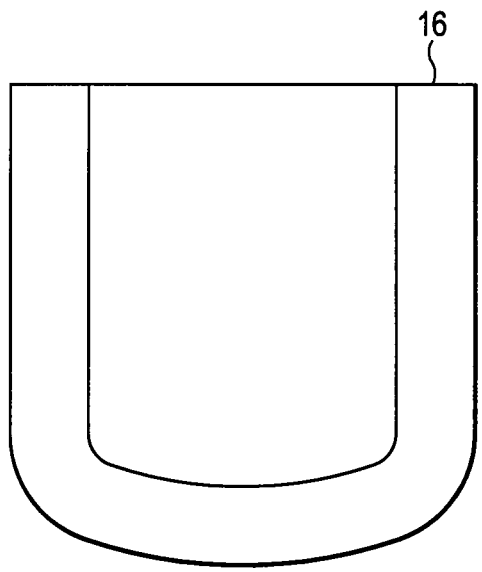

Indicated generally at 10 in FIG. 1 is a system capable of manufacturing a crucible in accordance with one embodiment of the present invention. System 10 is depicted during heating and fusing of silica grain to form a crucible, as will be more fully explained. Shown in cross section is a mold 12 that is mounted for rotation about an axis 14 of symmetry. In system 10, mold 12 is sized to make a crucible that has a nominal outside diameter of 609 mm and an average wall thickness of about 12.0 mm. The embodiments and examples described herein are for a crucible of this size; although the present method could be used equally well with other sized crucibles. A layer of silica grain 16 is held in position as a result of centrifugal force generated by rotating mold 12 about axis 14.

Mold 12 includes a plurality of air channels, like channels 18, 20, that communicate with inner mold surface 22. Each air channel, like channel 20, includes a porous graphite plug 24 that prevents silica grain from being drawn from the mold cavity into the air channels. The air channels communicate with manifolds, like manifolds 26, 28, 30, which in turn communicate with a bore 32. A rotary union 34 also communicates with bore 32.

Rotary union 34 in turn is connected via a conduit 36 to a three-way valve 38. One branch of three-way valve is connected first to a vacuum pump 40 and then to an exhaust gas treatment system 42, which vents to air. Vacuum pump 40 is configured to draw air from the mold cavity via the air channels, like channels 18, 20, and ultimately through bore 32, valve 38, and exhaust gas treatment system 42. Vacuum pump 40 is also configured to provide programmable evacuation power, at least for controlling starting and stopping times. Valve 38 may be used to vent conduit 36, thus reducing the vacuum. The venting may be to atmosphere, or optionally as shown, to a conduit 44 that connects to an exhaust fan 46. The exhaust fan pulls air from a hood 48 and vents it to air. The speed of the exhaust fan can be controlled. It includes filters for filtering impurities that may be in the gasses drawn from conduit 44 or from hood 48. A second exhaust fan 50 pulls air into a second hood 52 and also vents to air after filtering.

It can be seen that exhaust hoods 48, 52 are positioned adjacent an opening 54 that is defined between the upper portion of mold 12 and a shield plate 56 about the circumference of each. The shield plate is sometimes referred to in the industry as a cooling plate, but its two primary functions do not relate to cooling. First, it functions to reflect ultraviolet light back into the mold cavity, which prevents formation of problematic gasses, such as ozone and $NO_x$ in the room where the crucible is being formed. Second, it partially seals the mold cavity from surrounding atmosphere thereby allowing it to contain higher concentrations of a gas—e.g., helium—that is pumped into the cavity. Although desirable, the present method could be implemented without the use of a shield plate, like shield plate 56.

A programmable power supply 58 provides voltage across a set of electrodes 60, 62, which extend through openings in shield plate 56 as shown. As is known, there can be two or more electrodes, which may be AC or DC powered. When sufficient voltage is applied across the electrodes, hot arc plasma 64 forms. The plasma is hot enough to fuse silica grain 16 in a manner that will be shortly described.

Also extending through an opening in shield plate 56 is a gas pipe 66. The gas pipe is connected to a gas supply controller 68, which is operative to select between helium, nitrogen, and hydrogen—or a selectable mix of any two or three—for supplying gas into the mold cavity via gas pipe 66.

Figure 2B:
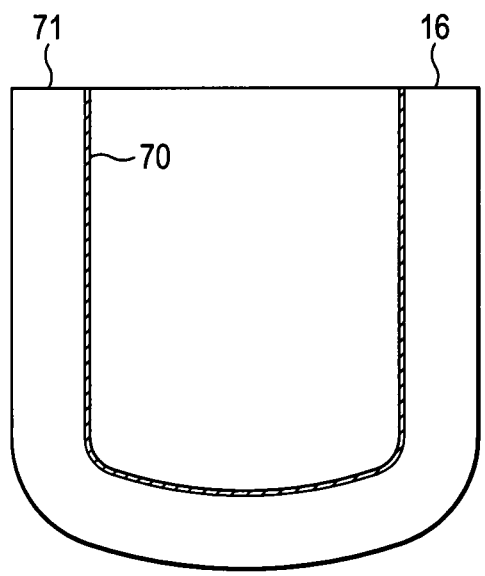
Figure 2C:
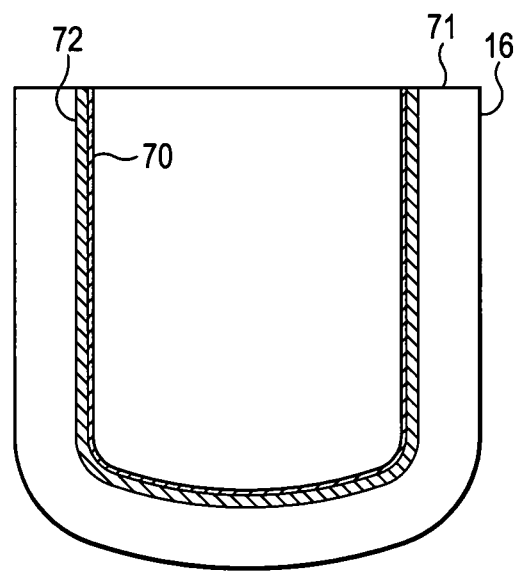

With reference to FIGS. 2A to 2E and Table 1 below, description will now be made of several embodiments of the present invention. Table 1 is a synchronizing table that describes the states of four process variables, namely vacuum (pump), the gas supply (helium and/or nitrogen), exhaust (fans), and electric power during each stage of the process. Before the process implemented in accordance with Table 1 begins, silica grain 16 is deposited into rotating mold 12 and formed into a crucible shape as shown in FIG. 1, all in a known manner. Immediately thereafter, each of the four process variables is off, as shown under Standby in Table 1. Next, under Step 1 of Table 1, helium is supplied via pipe 66 in to the mold cavity. This displaces the air in the mold cavity with helium and also replaces the air between the silica grains with helium. Soaking in helium can start while silica grain is introduced into the mold and shaped into the form shown in FIGS. 1 and 2A or it can begin after the grain is so formed. The bottom row of Table 1 provides the duration of the corresponding step in seconds—in Step 1, helium soaking lasting 50 seconds. In addition, pump 40 may optionally be started at a low level to provide a slight evacuation, which enhances replacement of air by helium between the silica grains.

Next, in Step 2, power supply 58 is activated to create a low power arc and correspondingly relatively low heat within the mold cavity. During this stage, the grain is heated to a temperature high enough to calcine the grain. Optionally, the grain is thereafter sintered. Initially, silica calcines, i.e., heats to the point where it begins to emit gas. Thereafter optional sintering begins, i.e., the silica grains begin to form a coherent mass without fusing. The silica calcination and initiation of sintering in Step 2 lasts for 30 seconds. During this stage the exhaust can optionally be at a low level so long as helium concentration in the mold cavity is maintained.

Next, in Step 3, vacuum pump 40 is turned on to a medium level and power supply 58 ramps the power up from low to high. During this stage an innermost layer 70 fuses to create a gas impermeable barrier. As discussed above, vacuum in the remainder of silica grain 16 increases due to the flow of gas into the silica grain occurring only at an upper portion 71 of the formed grain. Exhaust may be optionally started at the step while supplying sufficient helium to displace silica fume, ozone, and $NO_x$. Layer 70 may be around 0.3 mm in thickness.

In Step 4, a bubble free layer 72 is fused just under layer 70. To do so, the power and vacuum are both at high levels as shown in Table 1. This phase lasts for about 15 seconds. Due to the high vacuum that results from formation of layer 70, layer 72 is substantially clear. In addition, the flow of helium gas continues so that gas draw into upper portion 71 of silica grain 16 is primarily helium. This layer 72 may be about 2.0 mm in thickness. It is the layer, along with layer 70, that dissolves during an intense CZ process.

In Step 5, fusing continues into a deeper bubble free layer 76, one that does not dissolve during in the CZ process. In this step, helium is turned off, nitrogen is turned on, and power—and therefore heat—is reduced to medium. This layer, which may be around 1.0 to 3.0 mm thick, need not be as clear as layer 72 because layer 76 does not dissolve into the melt. As a result, performance of the crucible does not suffer if this layer includes some air bubbles. Nitrogen is turned on at this step because it is desirable to displace air—more precisely, oxygen—from the mold cavity when the plasma arc is on. When there is no oxygen, formation of environmentally undesirable gasses such as ozone and $NO_x$ is minimized. In the first stages, helium displaces air from the crucible and therefore minimizes formation of these gases in addition to the beneficial effects of displacing air in the grain with helium. Although helium could be continued to displace air in step 5 and beyond, nitrogen is cheaper, and the primary benefits to formation of the crucible in a helium atmosphere have been substantially met.

In Step 6, layer 78 is formed. It includes bubbles to scatter radiation from heaters during the CZ process. These bubbles are formed by reducing the vacuum thereby leaving gas in the silica that is fused in layer 78. Vacuum is reduced by venting conduit 36 to conduit 44 with valve 38. This sends the vented gasses to fan 46 and its associated filter assembly rather than to the atmosphere, which results in treatment of more gasses. Layer 78 is between about 5.0 and 8.0 mm thick.

Step 7 is a cool down stage in which the exhaust fans continue to run during cooling.

In Step 8, the process returns to standby.

This implementation does not require that innermost layer 70 be removed as must be done with some other processes. This is because layer 70 was formed in a rich helium atmosphere. As a result, any bubbles formed in layer 70 are primarily helium bubbles, which collapse before fusion is complete. Prior art systems start the vacuum pump and exhaust fans before igniting the arc and supplying gas. As a result, the silica grain in layer 70 does not have the opportunity to become and remain saturated with helium.

In one modification, supplied helium gas may be replaced by or mixed with hydrogen gas, which like helium easily diffuses in the silica crucible. In another embodiment, water vapor is injected into one or more of the gasses supplied via pipe 66. Fusion in the presence of water vapor improves bubble characteristics in the finished crucible and increases the apparent density of the supplied gas in the mold cavity.

TABLE 1

|  |  | Standby | Step 1 Soaking | Step 2 Calcine | Step 3 Skin | Step 4 1st clear layer | Step 5 2nd clear layer | Step 6 Opaque layer | Step 7 Cool-down | Step 8 Standby |
|---|---|---|---|---|---|---|---|---|---|---|
| Exhaust | Fans 46, 50 | OFF | OFF | OFF | OFF | ON | ON | ON | ON | OFF |
| Supply Gas | Helium | OFF | ON | ON | ON | ON | OFF | OFF | OFF | OFF |
|  | Nitrogen | OFF | OFF | OFF | OFF | OFF | ON | ON | OFF | OFF |
| Vacuum | Pump 40 | OFF | OFF | OFF | Medium | High | High | Low | OFF | OFF |
| Power | Plasma 64 | OFF | OFF | Low | Ramp up | High | Medium | Medium | OFF | OFF |
| Duration (seconds) |  | — | 50 | 30 | 20 | 15 | 200 | 500 | 250 | — |

Table 2 below depicts another embodiment. It is similar to the embodiment referenced in Table 1, except that helium gas is not used. As can be seen in Table 2, nitrogen is supplied just before the arc is turned on and continues for so long as the arc is energized. This may work well for crucibles that are used in applications where the presence of bubbles is not critical or in which a bubble-free innermost layer is formed by other methods that do not require helium. Supplying nitrogen and continuing its supply even after the vacuum is reduced by venting via valve 38 to conduit 44 results in reduced levels of ozone and NO$_x$. And venting the vacuum via conduit 44 to fan 46 and its associated filter assembly provides for effective treatment of the vented gasses that are formed. Once ozone and NO$_x$ are thinned by room air, which is the case when these gasses are evacuated via hoods, like hoods 48, 52, treatment becomes more difficult.

supply 58 has a 1000 kVA capacity, and fans 46, 50, have an evacuation capacity of 800 m³/hr each. The sequence and timing of the steps are shown below in Table 3. This example corresponds somewhat to the embodiment in Table 1, in which both helium and nitrogen are used. For this first example, total helium consumption is 5.0 cubic meters, and total nitrogen consumption is 30.0 cubic meters, with consumption of each gas at each step as well as totals being shown at the bottom of Table 3. The result of a vacuum bake test (which simulates the CZ process) on a section of the crucible formed in this example is shown in the photograph of FIG. 3. As can be seen, there are no bubbles or bubble growth in the innermost layer, which is the upper portion of the photograph. There is 0.5 mm between each line on the mea-

TABLE 2

|  |  | Standby | Step 1 Purging | Step 2 Calcine | Step 3 Skin | Step 4 1st clear layer | Step 5 2nd clear layer | Step 6 Opaque layer | Step 7 Cool down | Step 8 Standby |
|---|---|---|---|---|---|---|---|---|---|---|
| Exhaust | Fans 46, 50 | OFF | OFF | OFF | OFF | ON | ON | ON | ON | OFF |
| Supply gas | Nitrogen | OFF | Low | Low | High | High | High | High | OFF | OFF |
| Vacuum | Pump 40 | OFF | OFF | OFF | High | High | High | Low | OFF | OFF |
| Power | Plasma 64 | OFF | OFF | Low | Ramp up | High | Medium | Medium | OFF | OFF |
| Duration (seconds) |  | — | 50 | 30 | 20 | 15 | 200 | 500 | 250 | — |

In a first example, natural quartz grain was formed in the mold 12 cavity in the shape of grain 16. Programmable power sure in FIG. 3, which indicates a bubble free layer of over 2.0 mm.

TABLE 3

|  |  | Standby | Step 1 Soaking | Step 2 Calcine | Step 3 Skin | Step 4 1st clear layer | Step 5 2nd clear layer | Step 6 Opaque layer | Step 7 Cool-down | Step 8 Standby |
|---|---|---|---|---|---|---|---|---|---|---|
| Exhaust | Fans 46, 50 | 5% | 5% | 5% | 5% | 80% | 100% | 100% | 50% | 5% |
| Supply gas (m3/h) | Helium | 0 | 100 | 200 | 200 | 200 | 0 | 0 | 0 | 0 |
|  | Nitrogen | 0 | 0 | 0 | 0 | 0 | 200 | 200 | 0 | 0 |
| Vacuum | Pump 40 | 0% | 0% | 0% | 30% | 100% | 100% | 15% | 0% | 0% |
| Power | Plasma 64 | 0% | 0% | 5% | Ramp up | 100% | 80% | 80% | 0% | 0% |
| Duration (seconds) |  | — | 50 | 25 | 15 | 25 | 40 | 500 | 250 | — |

TABLE 3-continued

|  | Standby | Step 1 Soaking | Step 2 Calcine | Step 3 Skin | Step 4 1st clear layer | Step 5 2nd clear layer | Step 6 Opaque layer | Step 7 Cool-down | Step 8 Standby |
|---|---|---|---|---|---|---|---|---|---|
| Helium (m3) | 5.00 |  | 1.39 | 1.39 | 0.83 | 1.39 | 0.00 | 0.00 | 0.00 |
| Nitrogen (m3) | 30.00 |  | 0.00 | 0.00 | 0.00 | 0.00 | 2.22 | 27.78 | 0.00 |

A second example illustrated in Table 4 corresponds somewhat to the embodiment in Table 2, in which only nitrogen is used. The system used to make the crucible for this example is the same as in the first example. The total consumption of nitrogen gas was 32.43 cubic meters. Noticeable reductions of ozone and NO$_x$ were observed.

In both embodiments and examples, the cavity pressure may be controlled by controlling the speed of the exhaust fans, and therefore the rate of gas exhaustion via hoods 48, 52, and the rate of gas supply via gas pipe 66 to maintain the pressure in the cavity beneath plate 56 at about one atmosphere, although the invention could be implemented with other cavity pressures.

TABLE 4

|  |  | Standby | Step 1 Purging | Step 2 Calcine | Step 3 Skin | Step 4 1st clear layer | Step 5 2nd clear layer | Step 6 Opaque layer | Step 7 Cool-down | Step 8 Standby |
|---|---|---|---|---|---|---|---|---|---|---|
| Exhaust | Fans 46, 50 | 5% | 5% | 5% | 20% | 100% | 100% | 100% | 50% | 5% |
| Supply gas | Nitrogen | 0 | 30 | 30 | 100 | 200 | 200 | 200 | 0 | 0 |
| Vacuum | Pump 40 | 0% | 0% | 0% | 100% | 100% | 100% | 15% | 0% | 0% |
| Power | Plasma 64 | 0% | 0% | 5% | ramp up | 100% | 80% | 80% | 0% | 0% |
| Duration (seconds) |  |  | 50 | 25 | 15 | 25 | 40 | 500 | 250 | — |
| Nitrogen (m3) |  | 32.43 | 0.42 | 0.21 | 0.42 | 1.39 | 2.22 | 27.78 | 0.00 |  |

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method of making a silica glass crucible of the type having a substantially bubble-free inner layer, at least some of which dissolves when semiconductor materials are melted in the completed crucible, the method comprising:
    forming a silica grain layer having an innermost silica grain layer generally in the shape of a crucible having an upwardly directed opening in a cavity of a mold having ports operable to draw gas through the grain;
    positioning a cover over the opening;
    introducing a gas into the opening beneath the cover;
    displacing ambient atmosphere beneath the cover with the introduced gas;
    thereafter sintering the innermost silica grain layer prior to initiating evacuation of the introduced gas through the ports by applying electric power to a set of electrodes;
    thereafter initiating evacuation of the introduced gas through the ports;
    thereafter initiating fusing of the sintered grain and silica grain beneath the sintered grain to form the bubble-free inner layer;
    evacuating amounts of gas at a first rate from the opening after initiating sintering the innermost silica grain layer; and
    evacuating substantially more gas from the opening starting more than approximately 25 seconds after initiating sintering the innermost silica grain layer and after electric power exceeds a first level.

2. The method of claim 1 wherein sintering the innermost silica grain layer comprises applying electric power to a set of electrodes and wherein exhausting amounts of gas at a first rate from the opening after initiating sintering the innermost silica grain layer comprises exhausting amounts of gas from the opening for so long as the electric power is at a first level.

3. The method of claim 1 wherein sintering the innermost silica grain layer begins more than approximately 50 seconds after introducing the gas.

4. The method of claim 1 wherein the introduced gas comprises helium.

5. The method of claim 1 wherein the introduced gas comprises hydrogen.

6. The method of claim 1 wherein the introduced gas comprises a mixture of hydrogen and helium.

7. The method of claim 1 wherein the introduced gas comprises nitrogen.

8. The method of claim 1 wherein sintering the innermost silica grain layer comprises applying electric power to a set of electrodes.

9. The method of claim 1 wherein sintering the innermost silica grain layer comprises applying a first level of electric power to a set of electrodes for greater than about 25 seconds.

10. The method of claim 9 wherein sintering the innermost silica grain layer comprises applying a first level of electric power to a set of electrodes for about 30 seconds.

11. The method of claim 10 wherein forming the bubble-free layer comprises forming a bubble free layer having a thickness of approximately 2.0 mm.

12. The method of claim 11 further comprising fusing an opaque layer.

13. A method of making a silica glass crucible of the type having a substantially bubble-free inner layer, at least some of which dissolves when semiconductor materials are melted in the completed crucible, the method comprising:
- forming a silica grain layer having an innermost silica grain layer generally in the shape of a crucible having an upwardly directed opening;
- positioning a cover over the opening;
- introducing a gas into the opening beneath the cover;
- drawing the gas through the grain at a first flow rate;
- replacing substantially all of the air in the silica grain layer with the gas;
- sintering the innermost silica grain layer responsive to application of a first level of electric power to a set of electrodes while drawing the gas through the grain at a first flow rate;
- thereafter initiating fusing of the sintered grain and silica grain beneath the sintered grain to form the bubble-free inner layer responsive to substantially increasing the electric power applied to the electrodes above the first level,
- substantially increasing the gas flow rate after initiating fusing of the sintered grain and silica grain beneath the sintered grain, and again substantially increasing the gas flow rate during formation of the bubble-free layer.

14. The method of claim 13 wherein forming the bubble-free layer comprises fusing a layer having a thickness of approximately 2.0 mm.

15. The method of claim 14 further comprising fusing an opaque layer.

16. The method of claim 13 wherein drawing the gas through the grain is initiated before sintering the innermost grain layer.

17. The method of claim 13 wherein sintering the innermost silica grain layer comprises applying a first level of electric power to a set of electrodes for greater than about 25 seconds.

18. The method of claim 17 wherein sintering the innermost silica grain layer comprises applying a first level of electric power to a set of electrodes for about 30 seconds.

19. A method of making a silica glass crucible of the type having an upwardly directed opening and a substantially bubble-free inner layer, at least some of which dissolves when semiconductor materials are melted in the completed crucible, the method comprising:
- forming a silica grain layer generally in the shape of the crucible having an inner layer corresponding to the bubble-free layer;
- positioning a cover over the opening;
- introducing a gas into the opening beneath the cover;
- displacing ambient atmosphere beneath the cover with the introduced gas;
- drawing the gas through the silica grain layer at a first flow rate;
- replacing substantially all of the air in the silica grain layer with the gas;
- initiating formation of the substantially bubble-free inner layer responsive to application of electric power to a set of electrodes;
- forming a relatively thin portion of sintered silica grain in an innermost portion of the inner layer while drawing the gas through the silica grain layer at the first flow rate;
- thereafter substantially increasing the flow rate of the gas drawn through the silica grain layer to a level above the first flow rate;
- fusing the relatively thin portion of the inner layer and silica grain beneath the relatively thin portion to form the bubble-free layer, and
- substantially increasing the flow rate of the gas drawn through the silica grain layer during fusing the relatively thin portion of the inner layer and silica grain beneath the relatively thin portion.

20. The method of claim 19 wherein application of electric power to a set of electrodes comprises first applying a first level of power to the set of electrodes.

21. The method of claim 20 further comprising substantially increasing the electric power applied to the electrodes while fusing the relatively thin portion of the inner layer and silica grain beneath the relatively thin portion.

22. The method of claim 19 further comprising fusing an opaque layer adjacent the bubble-free layer.

23. The method of claim 22 further comprising substantially reducing the flow rate during fusing the opaque layer.

24. The method of claim 19 wherein drawing the gas through silica grain layer is initiated before forming the relatively thin portion of sintered silica grain.

25. The method of claim 19 wherein forming a relatively thin portion of sintered silica grain comprises applying a first level of electric power to a set of electrodes for greater than about 25 seconds.

26. The method of claim 25 wherein forming a relatively thin portion of sintered silica grain comprises applying a first level of electric power to a set of electrodes for about 30 seconds.

27. A method of making a silica glass crucible of the type having an upwardly directed opening and a substantially bubble-free inner layer, at least some of which dissolves when semiconductor materials are melted in the completed crucible, the method comprising:
- forming a silica grain layer generally in the shape of the crucible having an inner layer corresponding to the bubble-free layer;
- positioning a cover over the opening;
- introducing a gas into the opening beneath the cover;
- displacing ambient atmosphere beneath the cover with the introduced gas; and
- thereafter sintering an innermost layer of the inner layer responsive to application of a first level of electric power to a set of electrodes while drawing the gas through the silica grain layer responsive to a vacuum pump operating at a first operating level,
- fusing the relatively thin portion of the bubble-free layer with the pump operating at a substantial power increase over the first level of power.

28. The method of claim 27 further comprising fusing a relatively thin portion of the bubble-free inner layer.

29. The method of claim 27 wherein fusing the relatively thin portion of the bubble-free layer comprises fusing a layer having a thickness of approximately 0.3 mm.

30. The method of claim 27 further comprising fusing a second portion of the bubble-free layer.

31. The method of claim 30 wherein fusing the second portion of the bubble-free layer comprises fusing a layer having a thickness of approximately 2.0 mm.

32. The method of claim 30 further comprising fusing an opaque layer.

33. The method of claim 27 wherein drawing the gas through the silica grain layer is initiated before sintering an innermost layer of the inner layer.

34. The method of claim 27 wherein sintering an innermost layer of the inner layer comprises applying a first level of electric power to a set of electrodes for greater than about 25 seconds.

35. The method of claim 34 wherein sintering an innermost layer of the inner layer comprises applying a first level of electric power to a set of electrodes for about 30 seconds.

\* \* \* \* \*